Sept. 4, 1962      D. D. PEEBLES      3,052,559
STERILIZING PROCESS
Filed Aug. 17, 1959      2 Sheets-Sheet 1
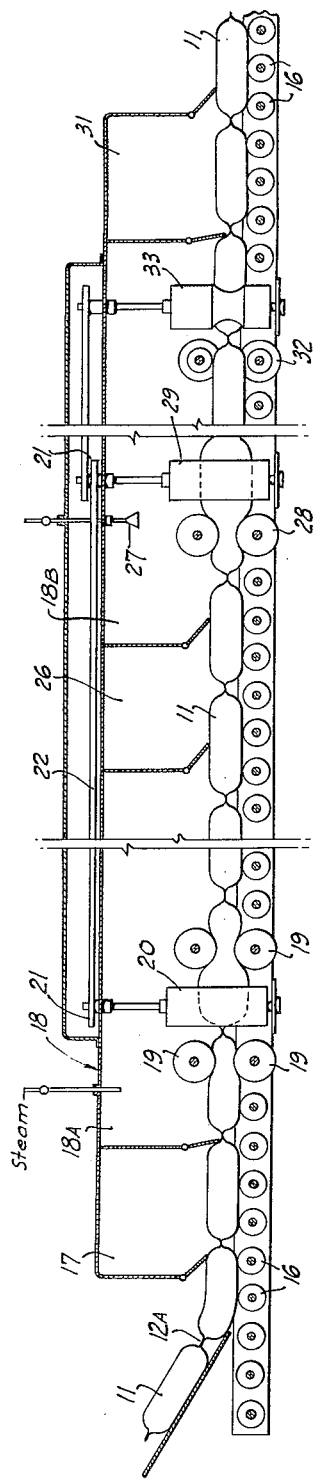
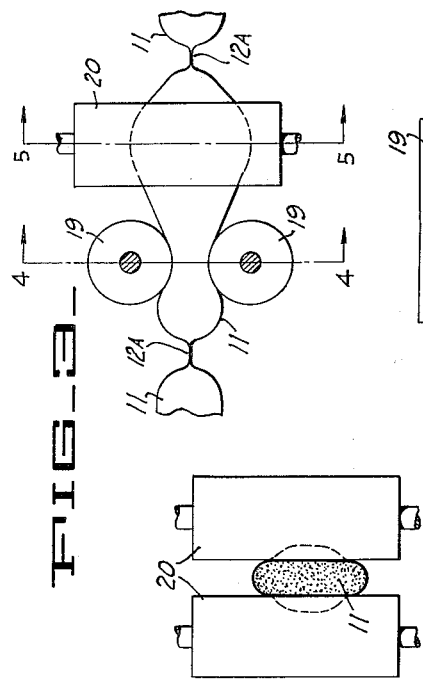
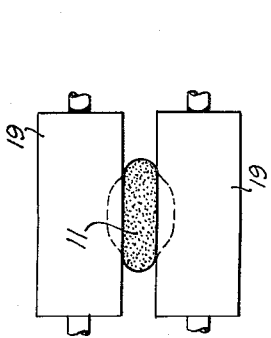
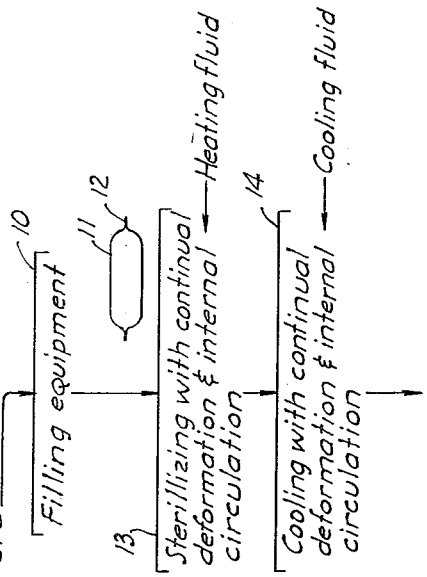
INVENTOR.
David D. Peebles
BY
ATTORNEYS

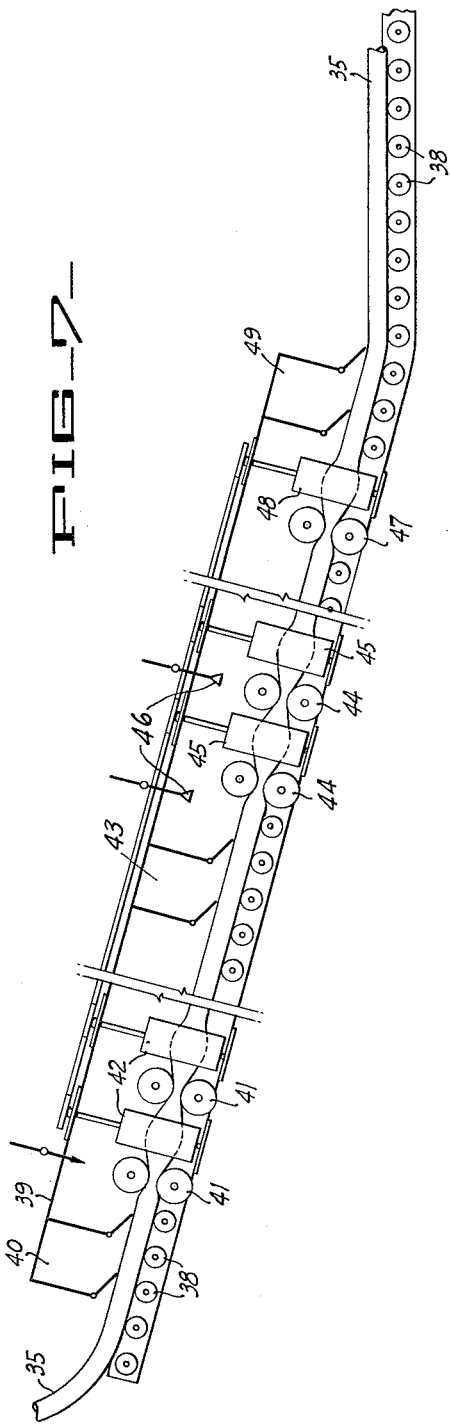
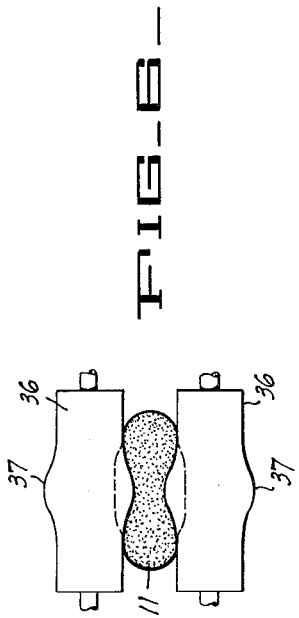

United States Patent Office 3,052,559
Patented Sept. 4, 1962

3,052,559
STERILIZING PROCESS
David D. Peebles, Davis, Calif., assignor to Foremost Dairies, Inc., San Francisco, Calif., a corporation of New York
Filed Aug. 17, 1959, Ser. No. 834,181
5 Claims. (Cl. 99—214)

This invention relates generally to processes for the heat treatment of various food products. In particular it is applicable to the heat sterilization and subsequent rapid cooling of materials which are relatively viscous or paste-like in consistency.

Aside from the frozen food industry, most preserved and ready to use fruit products are marketed in cans or like sealed containers. According to conventional canning practice, the prepared food product is placed in the cans, after which the cans are sealed and introduced into a steam heated retort. In the retorting equipment the cans are heated to a sterilizing temperature of the order of 240° F., and held for a period which may range from, say, 15 to 85 minutes, depending upon the character of the product. Thereafter, the cans are cooled as by immersion in cool water. The required period of heat sterilization is relatively short for a fluid medium, such as whole or evaporated dairy milk, because internal thermal circulation aids heat transfer and temperature distribution. However, for materials which tend to resist internal thermal circulation, such as materials of paste-like consistency, relatively long sterilization periods are required to insure adequate penetration of the heat, or, in other words, to insure raising all parts of the mass to the desired sterilizing temperature for the required sterilizing period. In addition, it is not possible to effect such rapid and effective cooling as is required to prevent excessive heat treatment with resulting injury to heat sensitive components.

As disclosed in my Patent 2,817,593, it is possible to induce internal circulation by spinning the cans on two axes while their walls are in contact with steam or like heating medium. This serves to accelerate heat transfer, and to insure rapid elevation of all parts of the mass to the desired sterilizing temperature. However, the method of Patent 2,817,593 is limited in its application to materials which are relatively fluid over the range of treatment temperatures, which extends from room temperature to the sterilizing temperature level. If it is attempted to use such method on a material which is relatively viscous or paste-like in consistency, spinning of the cans on two axes may not induce any substantial amount of internal circulation.

In addition to the conventional canning technique described above, it has been proposed to reduce the over-all time period of heat treatment for heat sterilization by applying flash heating to the material before it is introduced into cans. Thereafter the material is introduced into the cans and the cans sealed, all under sterile conditions. This method of aseptic canning likewise depends upon a fair amount of fluidity of the medium being handled, to facilitate flash heat sterilization. In other words, it is not adapted to the handling of materials which are highly viscous or paste-like in consistency.

In general, it is an object of the present invention to provide a process which can be applied to the heat sterilization of highly viscous or paste-like materials in sealed containers.

Another object of the invention is to provide a process of the above character which can be applied to the rapid cooling of highly viscous or paste-like materials immediately after heat sterilization.

Another object of the invention is to provide a process which facilitates the heat sterilization of paste-like materials, and which makes possible controlled heat sterilization with minimum injury to heat sensitive components.

Further objects of the invention will appear from the following description of which the preferred embodiments have been set forth in detail in conjunction with the accompanying drawings.

Referring to the drawing:

FIGURE 1 is a flow sheet illustrating the general steps in the present process.

FIGURE 2 is a side elevational view in sections schematically illustrating apparatus which can be used for carrying out sterilizing and cooling operations.

FIGURE 3 is a schematic view illustrating the manner in which the container is continually distorted by the use of rollers.

FIGURE 4 is a cross-sectional view taken along the line 4—4 of FIGURE 3.

FIGURE 5 is a cross-sectional view taken along the line 5—5 of FIGURE 3.

FIGURE 6 is a view like FIGURE 4, but indicating a special shaping of the rollers to distort the container in a particular manner.

FIGURE 7 schematically illustrates continuous apparatus for sterilization and cooling, which is adapted for use with a continuous tubular container.

The general steps of my process or method can be best understood by reference to FIGURE 1. In this instance, a food product of a paste-like consistency, as for example, a tomato concentrate, is being supplied to filling equipment 10, where it is introduced into containers of the pliable plastic type. In particular, we have reference to containers made of such pliable plastic materials as polyethylene, or Saran. Such a pliable container, after being filled with a paste-like material, is indicated at 11. It may be formed of a tube of pliable material filled with the product, and having heat sealed ends 12. Machines capable of forming such pliable containers, in conjunction with a filling operation, are known in the art.

In the next step 13, such containers are subjected to a heat sterilizing operation. A feature of the present invention is that the cross-sectional configuration of these containers is continuously distorted to cause continual internal circulation. As will be presently explained, this is carried out by application of mechanical pressure to localized regions of the container, whereby the distortion action progresses in a longitudinal direction as the container proceeds through the equipment.

Heat is transferred to the container and its contents by enveloping the container in a suitable fluid heating medium, such as steam. Heat is readily transferred through the pliable walls of the container, due to continual internal circulation in the paste-like mass. Also, such circulation promotes uniform distribution of the heat to all parts of the mass. As a result, the temperature of the mass of material is rapidly elevated to the desired sterilizing temperature, of say 240° F., and is held at such temperature for the desired sterilizing period. At the end of the sterilizing period, the containers are progressed to the cooling step 14, which is likewise carried out with continual deformation of the cross-sectional configuration, with resulting continual internal circulation. This again serves to cause effective heat dissipation from the mass of the material, through the pliable walls of the container, to the surrounding cooling medium, which may be water.

After cooling, the containers may be packaged in any desired manner for marketing. For example, they can be placed in cardboard cartons, whereby the pliable container is protected against accidental injury.

FIGURE 2 illustrates apparatus of the type which can be used for carrying out the sterilizing and cooling operations. The containers being supplied to the equipment are shown connected. As shown in FIGURE 3, the containers are connected by the flattened sealed portions 12A, which are severed after processing is complete.

The apparatus shown in FIGURE 2 consists of a conveyor 16, such as one of the roller type, with the rollers being driven by suitable means (not shown). The containers progress at a constant rate from one end of the equipment to the other. At the left end of the equipment, the filled containers are shown being supplied to the conveyor 16, and are progressed through the vapor trap 17 into the housing 18. The sterilizing portion 18A of the housing, which the containers enter, is supplied with steam or other heating fluid as indicated. The steam may be superheated, and may or may not be diluted with hot air or other gas, to provide the desired sterilizing temperature level.

As the containers progress through the sterilizing section 18A of the housing, they are acted upon by a series of squeezing rollers. Thus, a pair of horizontal rollers 19 are spaced a distance substantially less than the normal vertical dimensioning of the containers, whereby as the containers are passed through the rollers, they are squeezed in a vertical direction. The rollers are driven in opposite directions by suitable means (not shown) whereby the containers progress through the same with continual progression of the squeezing action from one end of the container to the other. As the container leaves the rollers 19, they may recover some vertical dimensioning, but in general they may remain more or less flattened. The next set of squeezing rollers 20 are disposed vertically, and serve to squeeze the containers in a horizontal direction. These rollers are likewise rotated in opposite directions to advance the containers being squeezed, and they are driven by suitable means such as the sprockets 21 and the chains 22. Following their passage through the set of vertical rollers 20, the containers are successively acted upon by further sets of horizontal and vertical rollers, whereby the squeezing action occurs recurrently to induce sufficient internal circulation for adequate heat transfer and distribution of heat to the desired sterilizing level. After being heated to the desired sterilizing level, the squeezing action may be discontinued, since it is no longer required to maintain the temperature level.

FIGURES 3–5 illustrate how the squeezing action progressively changes the cross-sectional configuration of the container. This necessarily causes forced internal circulation and mixing.

At the discharge end of the sterilizing section 18A, the containers pass through the vapor lock 26, to the cooling section 18B. Here the containers are subjected to a cooling fluid, such as a spray of cold water from the nozzles 27. Within the cooling section, the containers are again successively squeezed by the several pairs of horizontal and vertical squeezing rollers 28 and 29.

Before the cooled containers are discharged through the final vapor lock 31, it is desirable to form them to a desired shape. This can be done by suitable mechanical forming means such as the horizontal and vertically disposed forming rollers 32 and 33. The configuration of these rollers in such that they shape the bag to the desired dimensions and cross-sectional configuration. Thus, the shaped cross-sectional configuration may be substantially rectangular, or oval.

It will be evident that in its progression through the sterilizing section of the equipment described above, the continuous squeezing in opposite directions, with the progression of the squeezed areas longitudinally of the containers, effectively causes internal circulation and intermixing of the paste-like material, with the result that the contents rapidly take up heat until all parts of the mass are at the elevated sterilizing temperature. In the cooling section substantially the same effect occurs, in that the continual squeezing in opposite directions, with progression of the squeezing zones longitudinally of the containers, causes forced mechanical internal circulation and inter-mixing with resultant rapid dissipation of heat through the walls of the container to the cooling medium.

In general, my process makes it possible to effect a heat sterilization within pliable containers, within reasonable over-all heat treatment limits. Excessive localized heating is avoided, and in general the sterilizing operation can be properly controlled to avoid injury to heat sensitive components.

In the embodiment described the squeezing rollers are illustrated as being cylindrical. It will be evident that they can be otherwise shaped to accentuate internal circulation. For example, as shown in FIGURE 6, the rollers 36 are provided with bulged portions 37, whereby the container is squeezed to a figure 8 configuration.

In FIGURE 7, I have shown another embodiment of the sterilizing and cooling apparatus, which utilizes a continuous tube-like container 35. In this instance, a paste-like material is introduced into a continuous pliable tube, and this filled tube is then supplied to the apparatus. The tube rests upon roller conveyor 38 or other suitable supporting surface, which is arranged at an inclination to the horizontal to avoid back displacement of the material.

At the entrance end of the housing 39, the container passes through the vapor-lock 40, and into the main sterilizing chamber, where the containers are subjected to steam. As the tube-like container passes through the sterilizing section, it is acted upon repeatedly by the horizontal and the vertical sets of rollers 41 and 42. At the end of the sterilizing section, the container may pass through a vapor-lock 43, into the cooling section, where the container is again acted upon by the several horizontal and vertical sets of rollers 44 and 45. In this section, the container is in contact with cold water or other cooling medium, as indicated by the water spray nozzles 46.

At the end of the cooling section, the container is acted upon by the horizontal and vertical forming rollers 47 and 48, which form the container to a desired cross-sectional configuration. Thereafter, the container continuously progresses to the exterior through the vapor-lock 49. Such a continuous or extended container can be compressed and heat sealed at regular intervals, to provide individual containers, which can be left connected or severed as desired.

It will be evident that my process can be applied to a wide variety of materials which have the characteristic of being paste-like or relatively viscous. Particular reference can be made to tomato puree concentrate having a solids content which may range from 20 to 45%. Also, reference can be made to other tomato purees or materials containing gel-forming compounds, which remain viscous during sterilization. Also, reference can be made to soups and soup stocks, containing such ingredients as vegetable solids together with meat stock, gelatin and the like. While it is anticipated that the materials will have finely divided solids, the presence of larger solids will not interfere with the desired action, provided the larger solids are sufficiently soft to avoid injury to the pliable walls.

The apparatus disclosed herein is disclosed and claimed in my application Serial No. 158,633, filed November 16, 1961, entitled Sterilizing Apparatus, and which is a division of the present application.

I claim:

1. In a heat treatment method for food products, subjecting relatively viscous material in a closed pliable plastic container to an external fluid heat transfer medium for effecting a heat exchange between the material within the container and the medium through the pliable walls of the container, and continually distorting the cross-sectional configuration of the container during such heat exchange to cause internal circulation of the material.

2. A process as in claim 1 in which said last step is carried out by recurrently distorting the container in different directions.

3. A method as in claim 1 in which said last named step is carried out by recurrently squeezing the container in different directions to continually change its cross-sectional configuration.

4. A process as in claim 1 in which said last step is carried out by progressively squeezing the container to various cross-sectional configurations, said squeezing being continuously progressed in a direction longitudinally of the container.

5. A process as in claim 1 in which said last step is carried out by squeezing the container in general directions at right angles to each other and in regions spaced in the direction of the length of the container, said squeezing being progressed in the direction of the length of the container.

References Cited in the file of this patent

UNITED STATES PATENTS

| | | |
|---|---|---|
| 1,596,606 | Fooks | Aug. 17, 1926 |
| 2,368,945 | Peebles | Feb. 6, 1945 |
| 2,380,134 | Waters | July 10, 1945 |
| 2,517,542 | Clifcorn | Aug. 8, 1950 |
| 2,569,656 | Chissom | Oct. 2, 1951 |
| 2,816,837 | Halsman | Dec. 17, 1957 |
| 2,817,593 | Peebles | Dec. 24, 1957 |